United States Patent
Shiozawa et al.

(10) Patent No.: US 7,940,309 B2
(45) Date of Patent: May 10, 2011

(54) OPTICAL LOW PASS FILTER AND IMAGE-CAPTURING DEVICE

(75) Inventors: Masaki Shiozawa, Sagamihara (JP); Tatsushi Nomura, Sagamihara (JP)

(73) Assignee: Nikon Corporation, Tokyo (JP)

( * ) Notice: Subject to any disclaimer, the term of this patent is extended or adjusted under 35 U.S.C. 154(b) by 961 days.

(21) Appl. No.: 11/660,388

(22) PCT Filed: Sep. 15, 2005

(86) PCT No.: PCT/JP2005/017050
§ 371 (c)(1),
(2), (4) Date: Feb. 16, 2007

(87) PCT Pub. No.: WO2006/030863
PCT Pub. Date: Mar. 23, 2006

(65) Prior Publication Data
US 2007/0247733 A1    Oct. 25, 2007

(30) Foreign Application Priority Data

Sep. 17, 2004 (JP) ................. 2004-271785
Feb. 16, 2005 (JP) ................. 2005-038917
Feb. 17, 2005 (JP) ................. 2005-040261
May 23, 2005 (JP) ................. 2005-150026

(51) Int. Cl.
*H04N 5/228* (2006.01)

(52) U.S. Cl. ............ 348/222.1; 348/335; 348/340; 348/345; 348/348

(58) Field of Classification Search .......... 348/222.1, 348/335, 340, 345, 348; 359/885
See application file for complete search history.

(56) References Cited

U.S. PATENT DOCUMENTS

| 5,483,284 A | 1/1996 | Ishiguro |
| 5,801,389 A * | 9/1998 | Mizutani et al. ............... 250/548 |
| 5,801,763 A * | 9/1998 | Suzuki ........................... 348/77 |
| 7,193,780 B2 * | 3/2007 | Wada et al. ................... 359/586 |
| 7,253,896 B1 * | 8/2007 | Novikov et al. ............... 356/327 |

FOREIGN PATENT DOCUMENTS

| JP | A 60-101519 | 6/1985 |
| JP | A-60-136715 | 7/1985 |
| JP | A-63-307428 | 12/1988 |
| JP | A 64-40812 | 2/1989 |
| JP | A 1-261012 | 10/1989 |
| JP | A 3-38978 | 2/1991 |
| JP | A-3-54539 | 3/1991 |
| JP | A 3-141681 | 6/1991 |
| JP | A-4-275534 | 10/1992 |
| JP | A 2002-122813 | 4/2002 |
| JP | A-2004-78083 | 3/2004 |

OTHER PUBLICATIONS

Nov. 9, 2010 Office Action issued in Japanese Patent Application No. 2004-271785 (with translation).
Nov. 9, 2010 Office Action issued in Japanese Patent Application No. 2005-038917 (with translation).

(Continued)

*Primary Examiner* — Yogesh K Aggarwal
(74) *Attorney, Agent, or Firm* — Oliff & Berridge, PLC

(57) ABSTRACT

An optical low pass filter includes: a light transmitting member (41); and a refractive index distribution generation means (42) that generates a refractive index distribution cyclically changing within the plane of the light transmitting member (41). The refractive index distribution generation means includes a piezoelectric element, for example, and generates the refractive index distribution by generating the compressional wave in the light transmitting member (41) with a high frequency voltage being applied to the piezoelectric element.

21 Claims, 13 Drawing Sheets

OTHER PUBLICATIONS

Nov. 9, 2010 Office Action issued in Japanese Patent Application No. 2005-040261 (with translation).
Feb. 1, 2011 Office Action in Japanese Application No. 2005-150026, with translation.
Feb. 1, 2011 Office Action in Japanese Application No. 2005-038917, with translation.
Jan. 25, 2011 Office Action in Japanese Application No. 2004-271785, with translation.

* cited by examiner

OPTICAL LOW PASS FILTER AND IMAGE-CAPTURING DEVICE

TECHNICAL FIELD

The present invention relates to an optical low pass filter which performs light beam branching, and to an image-capturing device which utilizes this optical low pass filter.

BACKGROUND ART

In an image-capturing device such as a video camera or a digital camera or the like which employs an image sensor, an image which is imaged by a lens is converted into an electrical signal by the image sensor. At this time, if a high frequency component which is at the same frequency level or higher than the sampling frequency of the image sensor is included in the image of the object to be photographed, then the phenomenon of deterioration of the photographic image may occur, which is undesirable. Due to this, an optical low pass filter is used with this type of image-capturing device, with the objective of attenuating high frequencies in the image formed of the object to be photographed.

An optical low pass filter is a device which, by separating a beam of light from the object to be photographed into a plurality of beams, attempts to eliminate the image of the high frequency component therein; and, generally, the method is employed of taking advantage of the birefringence character of a crystalline material to separate the light beam into an ordinary beam and an extraordinary beam. Quartz crystal or Chile saltpeter or the like is known as a crystalline material which is endowed with the birefringence character (for example, refer to Patent Reference #1). Furthermore, instead of employing a crystalline material which is endowed with the birefringence character, sometimes the effect of diffraction by a minute periodic structure may also be utilized.

Moreover, although with the per se known type of optical low pass filter described above the frequency characteristic is fixed, such a device has been proposed in which it is possible to alter the frequency characteristic (for example, refer to Patent Reference #2). With this optical low pass filter, the birefringence character which is generated by applying a mechanical stress to an optical material is employed, so that the light beam from the object to be photographed is separated into a plurality of beams.

Patent Reference #1: Japanese Laid-Open Patent Publication 2002-122813.

Patent Reference #2: Japanese Laid-Open Patent Publication 2003-167123.

DISCLOSURE OF THE INVENTION

Problems to be Sold by the Invention

However, with such a per se known type of optical low pass filter as described above which employs the birefringence character of a crystalline material or the effect of diffraction with a periodic structure, it has been difficult to perform photography according to the intentions of the photographer, since the separation characteristic of the optical low pass filter is fixed.

Furthermore, with an optical low pass filter which employs the birefringence character when a mechanical stress is applied to a filter material, an extremely large stress is required in order to generate the necessary birefringence. Due to this it is necessary to make the construction very strong, and there has been the shortcoming that, along with the device becoming large in scale, it also becomes heavy.

Means for Solving the Problems

The optical low pass filter according to the present invention is characterized by comprising: a light transmitting member; and a refractive index distribution generation means that generates a refractive index distribution cyclically changing within the plane of the light transmitting member.

It should be understood that, as the light transmitting member, it is desirable to use a light transmitting member that has an optical transmittivity of greater than or equal to 50% per 1 mm of thickness at least in the range from wavelength 450 nm to 750 nm.

Furthermore, the refractive index distribution generation means may generate refractive index distributions in each of a plurality of different directions within the plane of the light transmitting member; or a plurality thereof may be disposed along at least one edge of the light transmitting member.

Moreover, it would also be acceptable to arrange to provide a plurality of intersecting refractive index distribution generation means, each generating a refractive index distribution that varies cyclically within the plane of the light transmitting member in a direction that intersects the direction of the refractive index distributions generated by the plurality of refractive index distribution generation means.

For the refractive index distribution generation means, there may be used one that generates the refractive index distribution by generating a compressional wave in the light transmitting member; for example, there may be used a piezoelectric element that applies a high frequency voltage thereto. And, it would also be acceptable to arrange to provide a frequency control means that controls the frequency of the high frequency voltage, or an electrical power control means that controls the level of the electrical power applied to the piezoelectric element.

It is desirable, if the minimum electrical power level among those levels that make the intensity of the 0-th order diffracted beam of the subject light that is emitted from the light transmitting member be a relative minimum value is termed P, for the electrical power control means to control the electrical power that is supplied to the piezoelectric element within a range from zero to P. Furthermore, it would also be acceptable, if the minimum electrical power level among those levels that make the intensity of the 0-th order diffracted beam of the subject light that is emitted from the light transmitting member be 50% of the intensity of the 0-th order diffracted beam when the electrical power is zero is termed P, to arrange for the electrical power control means to control the electrical power that is supplied to the piezoelectric element within a range from zero to P.

Furthermore, it would also be acceptable to include a multiple reflection portion formed in the end portion of the light transmitting member in the direction of progression of the compressional wave, that multiply reflects the compressional wave. As this multiple reflection portion formed in the end portion of the light transmitting member in the direction of progression of the compressional wave, it would be acceptable to form, for example, a plurality of surfaces inclined with respect to the direction of progression of the compressional wave, the compressional wave that has entered the multiple reflection portion being multiply reflected between the plurality of surfaces; and, in this case, it would also be acceptable to form a plurality of cutaway grooves inclined with respect to the direction of progression of the compressional wave in the end portion in the direction of progression of the compressional wave, and for the sides of these cutaway grooves to constitute the plurality of surfaces.

Moreover, it would also be accept-able to form, as the multiple reflection portion, a plurality of through holes in the end portion in the direction of progression of the compressional wave, the compressional wave that has entered the multiple reflection portion being multiply reflected by the sides of these through holes.

And, a first aspect of the image-capturing device according to the present invention is characterized by including: an image sensor that captures an image of a subject that has been formed by a photographic optical system; and any one of the optical low pass filters described above. This optical low pass filter is disposed upon the optical axis between the photographic optical system and the image sensor.

And, a second aspect of the image-capturing device according to the present invention is characterized by including: an image sensor that captures an image of a subject that has been formed by a photographic optical system; an optical low pass filter wherein a plurality of the refractive index distribution generation means are disposed along at least one edge of the light transmitting member, or an optical low pass filter that includes a plurality of refractive index distribution means for intersecting; a mode setting means that selects and sets any one of a plurality of different photographic modes; and a control means that controls each of the plurality of refractive index distribution generation means independently, according to the photographic mode that has been set by the mode setting means.

And, a third aspect of the image-capturing device according to the present invention is characterized by including: an image sensor that captures an image of a subject that has been formed by a photographic optical system; an optical low pass filter that controls the range of the electrical power supplied to the piezoelectric element in a range between zero and P; and a setting means for setting the electrical power P.

Advantageous Effect of the Invention

Since, according to the present invention, by generating a refractive index distribution that changes cyclically within the plane of the light transmitting member, the incident light beam is separated by diffraction, accordingly it is possible to change the separation characteristics of the optical low pass filter in a simple and easy manner by, for example, varying the refractive index distribution by varying the electrical power supplied to the piezoelectric element in a range from zero to P.

BEST MODE FOR CARRYING OUT THE INVENTION

Figure 1:
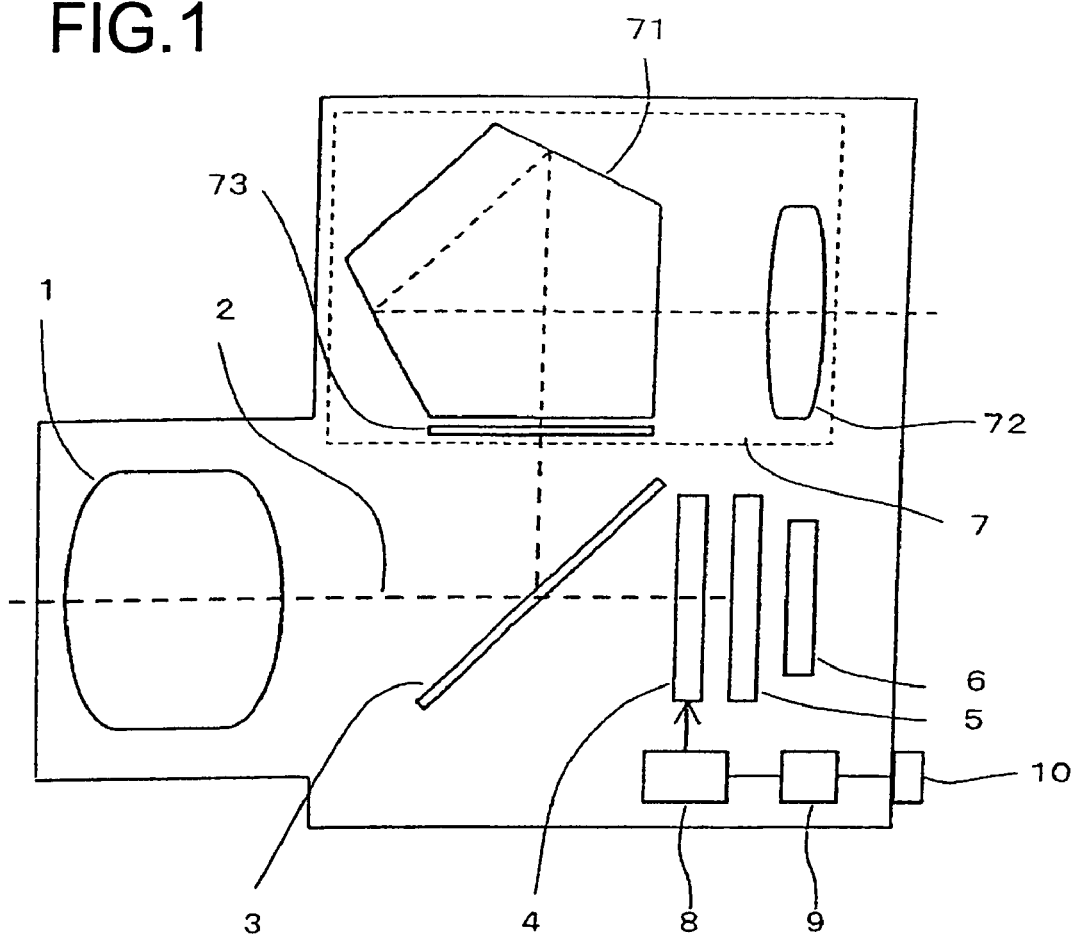
FIG. 1 is a block diagram showing the general structure of the image-capturing device of the present invention.

In the following, embodiments of the present invention will be explained with reference to the drawings. FIG. 1 is a figure showing an embodiment of the image-capturing device of the present invention, and shows the general structure of a single lens reflex type digital still camera. In FIG. 1, the reference symbol 1 denotes a photographic optical system, while 3 is a quick return mirror, 4 is an optical low pass filter, 5 is a focal plane shutter, 6 is an image sensor, 7 is a viewfinder optical system, 8 and is a drive circuit for the optical low pass filter 4. The drive circuit 8 is connected to a control unit 9. The reference symbol 10 denotes an actuation unit which comprises an actuation button or an actuation dial or the like: it is possible for the user to issue various types of actuation command to the camera by actuating this actuation unit 10. Furthermore, although this is not shown in the figure, the camera comprises a display section such as an LCD monitor or the like, and is adapted so that it is possible to actuate the actuation unit 10 so as to display an actuation setting screen upon this display section, so as thereby to make condition settings and the like for a piezoelectric element which will be described hereinafter.

Each of the optical low pass filter 4, the focal plane shutter 5, and the image sensor 6 is disposed upon the optical axis 2 of the photographic optical system 1. The quick return mirror 3 is built so as to be shiftable between the position shown in FIG. 1 in which it is upon the optical axis, and a position not shown in the figures in which it is off the optical axis. When the quick return mirror 3 is located in its position upon the optical axis as in FIG. 1, then the light of the object to be photographed (the subject light) from the photographic optical system 1 is reflected by the quick return mirror 3 into the viewfinder optical system 7. A penta prism 71 and an eyepiece lens 71 are provided to this viewfinder optical system 7, and an image of the object to be photographed can be observed via the eyepiece lens 72.

On the other hand, when photographing the object (the subject) to be photographed, along with the quick return mirror 3 being shifted to its position away from the optical axis, not shown in the figures, opening and closing operation of the focal plane shutter 5 is performed, and thereby the image sensor 6 is exposed to the light from the object to be photographed for a predetermined time period. During this exposure, the optical low pass filter 4 is driven by the drive circuit 8. In other words, the high frequency component in the light from the object to be photographed which is incident upon the image sensor 6 is eliminated by the optical low pass filter 4. The image sensor 6 consists of a solid-state image sensor such as a CCD or a CMOS or the like, and comprises a plurality of light receiving pixels which are arranged in a two dimensional array.

<Explanation of the Optical Low Pass Filter 4>

Figure 2:
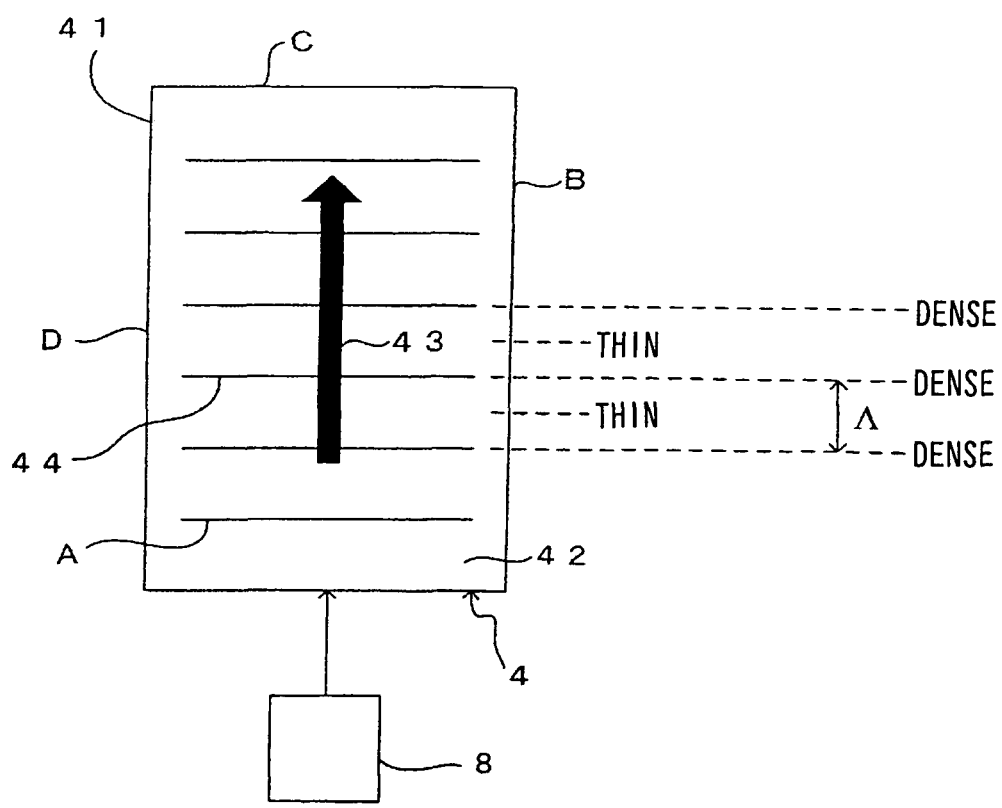
FIG. 2 is a plan view of an optical low pass filter 4 as seen from the side of a photographic optical system 1.

Next, the optical low pass filter 4 will be explained. FIG. 2 is a plan view of the optical low pass filter 4 as seen from the side of the photographic optical system 1. The reference symbol 41 denotes a rectangular flat plate shaped light transmitting member; and while, here, a rectangular shaped parallel flat plate made from quartz glass is used, it is desirable, as the material for this light transmitting member 41, to use a glass or single crystal or the like, whose transparency for the light which is being employed is satisfactory.

For example, in the case of a camera or the like which captures and deals with visible light, a material should be used which is transparent to light at least in the range from 450 nm wavelength to 750 nm wavelength. Furthermore, with regard to the degree of light transmission, it is desirable for the spectral transmittivity in the wavelength band described above to be greater than or equal to 50% per each 1 mm of member thickness. This type of measurement of the light transmittivity is performed with a spectral transmittivity measurement device such as a spectrophotometer or the like. As materials whose light transmission is satisfactory: in the case of glass, crown glass, flint glass or quartz glass or the like are available; and, in the case of a crystalline material, lead molybdate, tellurium dioxide or the like are preferred. Of course, the light transmitting member 41 of the present invention is not to be considered as being limited to being made from these glasses and crystalline materials.

A piezoelectric element 42, which is an electrostrictive element, is fixed to the lower edge A of this rectangular shaped light transmitting member 41. It should be understood that the example shown in FIG. 2 is one which shows the case in which the light beam is separated by the optical low pass filter 4 in one direction (the vertical direction as shown in the figure); and, in the case of separation in one direction, the fixing position of the piezoelectric element 42 is not limited to being this lower edge A: it would be acceptable for it to be provided upon any one of the four edges A, B, C, and D. If the piezoelectric element 42 is provided upon the side A or the side C, then the light beam is separated vertically, while, if the piezoelectric element 42 is provided upon the side B or the side D, then the light beam is separated in the horizontal direction. Since the theory of this separation operation is the same in any of these cases, the representative case in which the piezoelectric element 42 is fixed to the side A will be described herein.

When a high frequency voltage is applied to the piezoelectric element 42 from the drive circuit 8, the piezoelectric element 42 vibrates in the vertical direction 10, as seen in the figure. When it is to function as an optical low pass filter, a high frequency voltage having a frequency of around 1 MHz~100 MHz is applied to the piezoelectric element 42. This frequency region is an ultrasound frequency bandwidth which is inaudible to the human ear, and, although a ceramic such as lead zirconate titanate (PZT) or barium titanate or the like is preferred for the piezoelectric element 42 which generates vibration of this type of frequency bandwidth, the material of the piezoelectric element is not necessarily limited to these.

When the piezoelectric element 42 vibrates, a compressional wave progresses from the lower edge A of the light transmitting member 41 towards its upper edge C as shown by the arrow sign 43, and its frequency is equal to the frequency of the electrical power which is applied to the piezoelectric element 42. As a result, a cyclic density distribution is generated in the interior of the light transmitting member 41, and a refractive index distribution which changes cyclically is generated within the plane of the light transmitting member 41. The reference symbol 44 denotes one of several successive wave fronts of this compressional wave, and these wave fronts 44 are orthogonal to the direction of progression 43 of the wave.

For example, if the positions of the wave fronts 44 are taken as being at portions where the distribution is dense, then the portions intermediate between them are portions where the distribution is thin. The interval between the dense portions is the wavelength $\Lambda$ of the compressional wave. In other words, the spatial period of this refractive index distribution is $\Lambda$. It should be understood that, although the piezoelectric element 42 is provided over the entire area of the side A, provided that a compressional wave is generated in the region where the light from the object to be photographed is incident, it is not necessary for this compressional wave to be provided over the entire area; it will be acceptable, even if this wave is provided only in the central portion of the side A.

Figure 3:
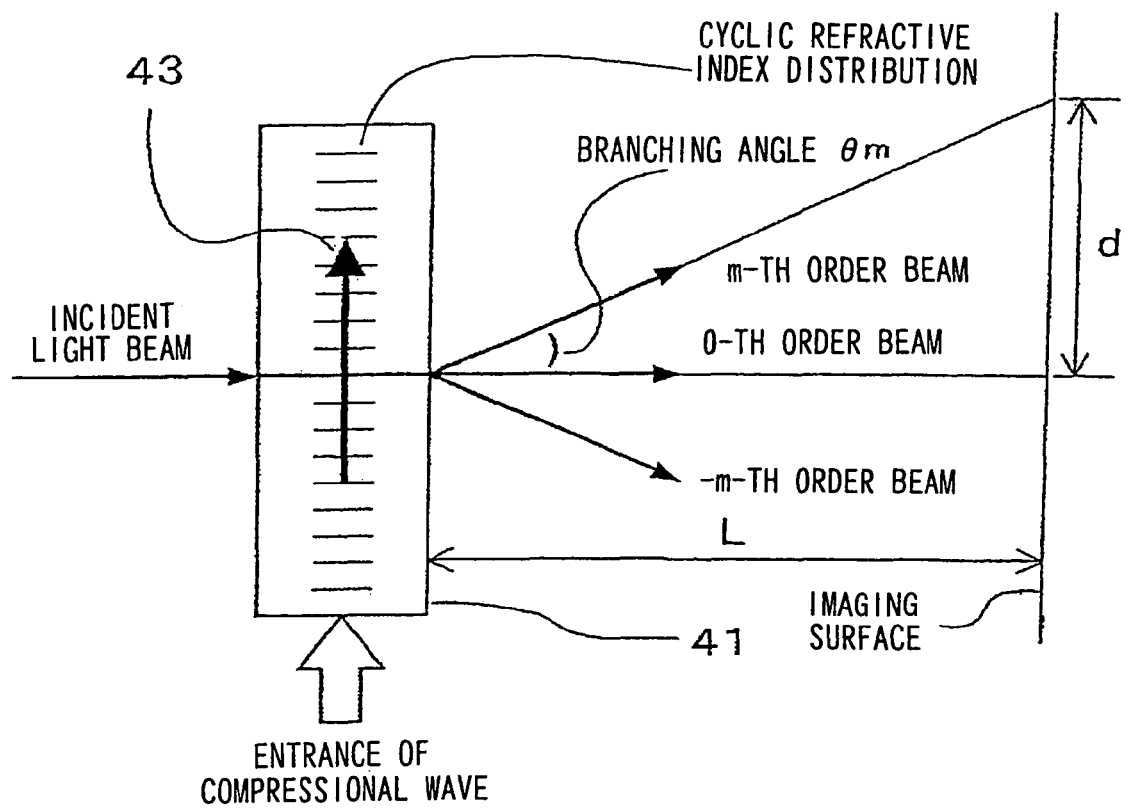
FIG. 3 is a figure for explanation of light beam separation by Raman-Nath diffraction.

When light is incident upon the light transmitting member 41 in which a cyclic refractive index distribution as shown in FIG. 2, due to an acoustic effect, the phenomenon of so-called Raman-Nath diffraction takes place. The optical low pass filter 4 of this embodiment is a device in which light beam branching is performed by taking advantage of this diffraction phenomenon. FIG. 3 is a figure for explanation of light beam separation by such Raman-Nath diffraction; this figure is seen from the same direction as FIG. 1.

When such a cyclic refractive index distribution is generated in the light transmitting member 41, and a light beam is incident upon this light transmitting member 41, the phase of the light passing through portions in which the refractive index is high is delayed, while the phase of the light passing through portions in which the refractive index is low is advanced. As a result, a diffraction phenomenon is engendered. A portion of the light beam which is incident upon the light transmitting member 41 is emitted in the same direction as the incident beam as the diffracted beam of the 0-th order, while other portions are emitted as diffracted beams of higher order, with their directions of progression changed to specific angles. Generally, in Raman-Nath diffraction, a plurality of diffracted beams appear of the 0-th order, the ±1st order, the ±2nd order, . . . ; while, with Bragg diffraction, the incident light beam is separated into only the 0-th order beam and a 1st order beam.

At this time, if the diffraction order is termed m and the wavelength of the light is termed $\lambda$, then the branching angle $\theta_m$ of the m-th order diffracted beam is given by the following Equation (1). Furthermore, if the frequency of the high frequency voltage applied to the piezoelectric element 42 is termed f and the speed of sound in the light transmitting member 41 is termed v, then the period (the width) of the cyclic refractive index distribution $\Lambda$ is given by the following Equation (2):

$$\sin \theta_m = m\lambda/\Lambda \qquad (1)$$

$$\Lambda = v/f \qquad (2)$$

If the distance from the light transmitting member 41 to the imaging surface of the image sensor 6 is termed L, and the width of the separation at the imaging surface is termed d, then the following Equation (3) holds. Sin $\theta_m$ may be considered as being the same as tan $\theta_m$, since the branching angle $\theta_m$ is small, so that the frequency f is given by the following Equation (4):

$$\tan \theta_m = d/L \qquad (3)$$

$$f = dv/(\lambda L) \qquad (4)$$

With, for example, the wavelength of the light being $\lambda=600$ nm, and the distance L being L=5 mm, the case will be considered in which quartz glass is used for the light transmitting member 41. Since the speed of sound in quartz glass is v=6 km/sec, it will be understood that, in order to make the separation width d be d=5 μm, it will be acceptable for the frequency of the applied voltage to be f=10 MHz. By changing the frequency f of the high frequency voltage in this manner, it is possible to adjust the separation width d, in other words to adjust the cutoff frequency of this optical low pass filter 4. As a result, with the same optical low pass filter 4, i.e. with a single optical low pass filter 4, it is possible to be compatible with various image sensors 6 of different pixel pitch, and with images of objects to be photographed which have different spatial frequencies.

Furthermore, by varying the value of the electrical power which is applied to the piezoelectric element 42, it is possible to vary the ratio between the intensity of the 0-th order beam and the intensity of the higher order beams, so that it is possible to respond to the intentions of the photographer simply and easily. When the value of the applied electrical power is varied so that the intensity of the compressional waves in the light transmitting member 41 varies, the amplitude of the cyclic refractive index distribution which is generated in the light transmitting member 41 also varies. For example, when the applied electrical power is increased, the compressional waves become stronger, and as a result the amplitude of the cyclic refractive index distribution becomes greater, so that the intensity of the 0-th order beam becomes lower, while the intensities of the higher order diffracted light beams such as the beams of the ±1st order and the ±2nd order and the like become greater. Conversely, when the applied electrical power becomes smaller, the compressional waves become weaker, and as a result the amplitude of the cyclic refractive index distribution becomes smaller, so that the intensity of the 0-th order beam becomes greater, while the intensities of the higher order diffracted light beams such as the beams of the ±1st order and the ±2nd order and the like become smaller.

Figure 4:
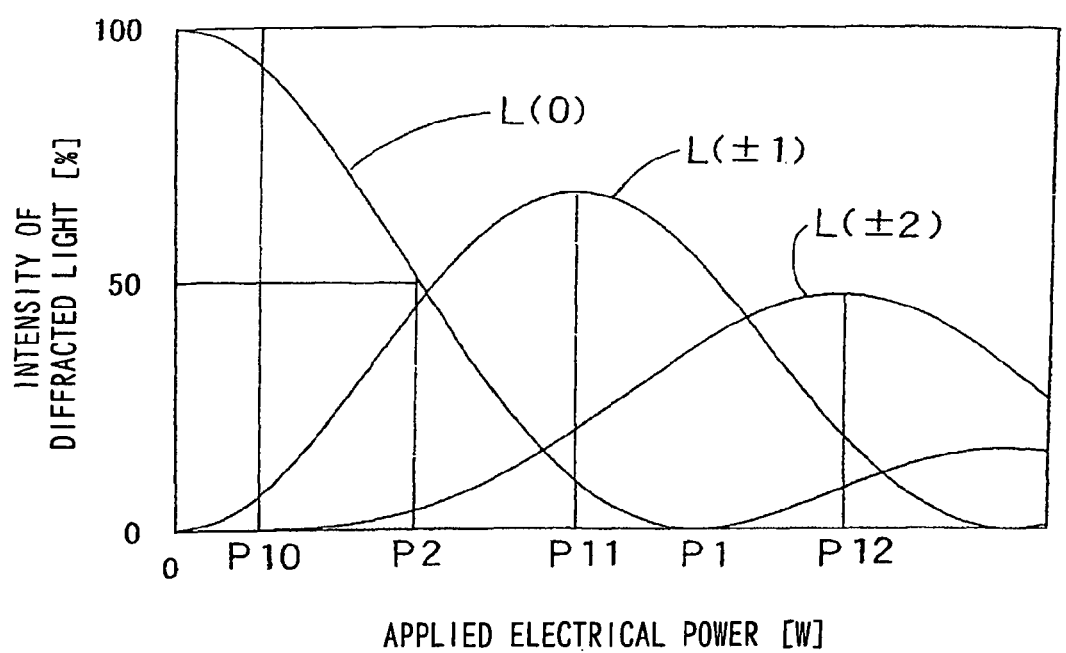
FIG. 4 is a figure showing the relationship between the electrical power applied to a piezoelectric element 42 and the intensities of diffracted light beams.

FIG. 4 is a figure showing the relationship between the electrical power applied to the piezoelectric element 42 and the intensities of the diffracted light beams. This figure shows the intensities of the 0-th order beam, of the 1st order beams, and of the ±2nd order beams resulting from Raman-Nath diffraction which are measured, when a light beam of a specified wavelength in the visible region (400 nm~800 nm) is incident upon the piezoelectric element 42 to which electrical power is being applied. In FIG. 4: the curve L(0) shows the intensity of the 0-th order beam; in relation to the 1st order beams, the curve L(±1) shows the total of the intensities of the +1st order beam and of the −1st order beam; and, in relation to the 2nd order beams, the curve L(±2) shows the total of the intensities of the +2nd order beam and of the −2nd order beam.

When the applied electrical power equals zero, only the 0-th order-beam appears, since Raman-Nath diffraction does not take place. If surface reflection and internal absorption by the light transmitting member 41 are ignored, then the intensity of the 0-th order beam is substantially equal to the intensity of the incident light beam. Thus the intensity of the 0-th order beam when no electrical power is applied is considered as being 100%. As the applied electrical power is progressively increased from zero, first the intensity of the 1st order beams generated by Raman-Nath diffraction gradually increases, and along with this the intensity of the 0-th order beam gradually decreases. At the electrical power stage P10 in FIG. 4, the 0-th order beam and the 1st order beams account for the largest portion of the diffracted beams, and the intensity of the 0-th order beam is near to 90%, while the intensity of the ±1st order beams (the total of the intensities of the +1st order beam and of the −1st order beam) is approximately the remaining 10%.

When the electrical power further increases from the stage P10, the ±2nd order light beams appear, and their intensity also increases along with increase of the electrical power. And, at the electrical power stage P2, the intensity of the 0-th order beam decreases down to 50%. When the electrical power further increases, the intensity of the ±1st order light beams attains its peak at the electrical power stage P11, and, when the electrical power increases beyond P11, not only the 0-th order beam, but also the ±1st order light beams start to decrease in intensity. When the electrical power further increases and reaches the level P1, then the intensity of the 0-th order beam reaches a relative minimum value. At this time, since the intensity of the 0-th order beam becomes zero, accordingly this 0-th order beam disappears. And, when the electrical power further increases from P1, the 0-th order beam again starts to increase, and the peak of the ±2nd order beams is attained at the electrical power level P12.

Since, along with the increase of the applied electrical power, the intensities of the 0-th order beam, of the ±1st order beams, and of the ±2nd order beams vary as shown in FIG. 4, accordingly, if for example the applied electrical power is set to P10, then the intensities of the 1st order beams and of the ±2nd order beams become small, and the intensity of the 0-th order beam becomes 90%, so that the effect as an optical low pass filter becomes small. On the other hand, when the applied electrical power becomes greater than P2, then, since the intensities of the ±1st order beams and of the ±2nd order beams become of the same order the intensity of the 0-th order beam, accordingly it is possible to obtain a great effect as an optical low pass filter.

By varying the level of the applied electrical power in this manner, it is possible simply and easily to vary the filtering effect of the optical low pass filter 4, and it is possible easily to respond to various types of performance requested by the user. For example if, in a situation in which the influence of moire patterning is small, the user wishes to photograph a sharp image, then the electrical power level is set to zero or to a small value like P11. Conversely, if the influence of moire patterning is large and the user desires to reduce it, then the electrical power level is set to be large as for example P2 or P12, so as to implement the beneficial effect of moire elimination. By varying the electrical power in this manner, it is possible to respond to various performance requests to the optical low pass filter 4.

When the applied electrical power is further brought to the level P1, then, since the intensity of the 0-th order beam becomes zero and the incident light beam is branched off into higher order beams than the 0-th order beam, accordingly it is not necessary to increase the applied electrical power any further in order to change the effect as an optical low pass filter. In other words, if the electrical power is changed from zero to the level P1, it is possible to set the intensity of the 0-th order beam to any desired value from 100% to 0%. It will be understood that, due to this, it will be acceptable to make the maximum capability of the electrical power supply unit for this image-capturing device such as a digital still camera or the like be P1. As a result it is possible to endow the light transmitting member 41 with a characteristic with which it is capable of serving as an optical low pass filter, while still keeping down the maximum electrical power required from the electrical power supply unit.

Furthermore, at the electrical power level P2, the intensity of the 0-th order beam becomes 50%, and thereby an optical branching effect is available which is of the same level as with an optical low pass filter which uses a form birefringent crystalline material. In other words, by varying the applied electrical power from zero to P2, it becomes possible to set the filtering performance of the light transmitting member 41 to any desired state between a state in which it has the same performance as a prior art optical low pass filter, and a state in which it only passes the 0-th order beam (i.e. a state in which it is not functioning as an optical low pass filter). If the filtering performance of the light transmitting member 41 is set to a level in which it is able to provide the same performance as that of a form birefringent crystalline material, then it is possible to reduce the maximum electrical power which is required from the electrical power supply unit to P2, which is lower than P1, so that it is possible to contemplate a further reduction in cost.

[Explanation of the Operation of this Filter]

As described above, this optical low pass filter 4 only functions as an optical low pass filter while its piezoelectric element 42 is being driven. Due to this, it is sufficient to drive the piezoelectric element 42 only when capturing an image of the object to be photographed is being performed by the image sensor 6, and it is not necessary to drive the piezoelectric element 42 when image-capturing operation is not being performed. For example, this optical low pass filter 4 may be operated as described below.

When the photographer full presses a release button (not shown in the figures) of the camera, a release switch (also not shown in the figures) which is turned ON along with the release button being full pressed operates, and the photographic operation starts. When this release switch is turned ON, along with a high frequency voltage (for example a voltage at 10 MHz) being applied by the drive circuit 8 to the piezoelectric element 42, the quick return mirror 3 is shifted to its position away from the optical axis. When this high frequency voltage is applied to the piezoelectric element 42, a compressional wave progresses within the light transmitting member 41 from its side A to its side C, as shown in FIG. 2.

Since as explained above the speed of sound within the quartz glass v=6 km/sec, if the distance between the sides A and C is 1 cm, then a cyclic refractive index distribution is generated in the entire area within the plane of the light transmitting member 41 after about 1.7 µs. Next, the focal plane shutter 5 is put into its released state and the image sensor 6 is exposed within the light flux (ray bundle) from the object to be photographed, so that image-capturing or photography is performed. Thereafter, the focal plane shutter 5 is closed, and, after shifting the quick return mirror 3 back to its position upon the optical axis, the applied voltage to the piezoelectric element 42 is turned OFF.

With the optical low pass filter 4 of this embodiment, the light transmitting member 41 itself does not vibrate mechanically merely due to the generation of the compressional wave (ultrasound) within the light transmitting member 41. Due to this, there is no generation of dust or the like from the optical low pass filter 4 itself, and the undesirable problem does not occur of dust being photographed upon the captured image.

[Variant Embodiments]

Figure 5:
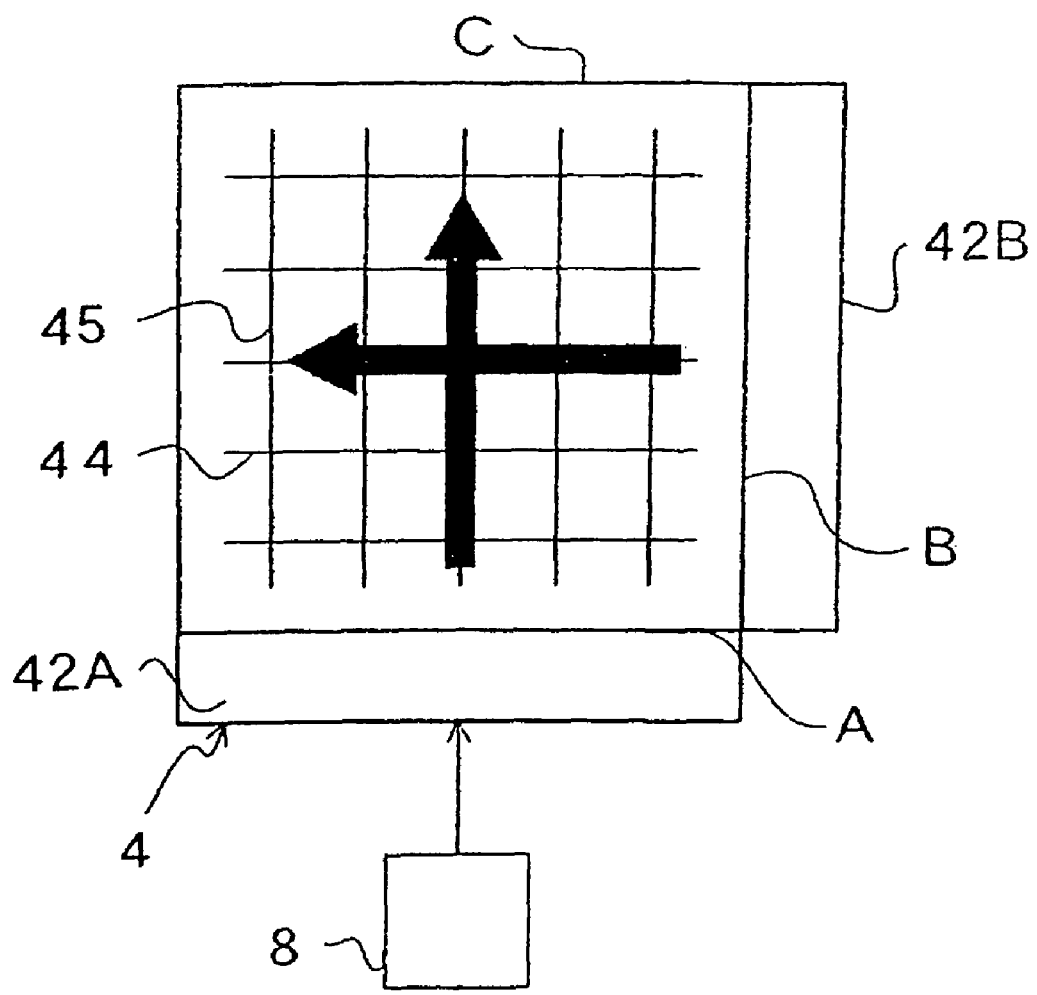
FIG. 5 is a figure showing the optical low pass filter 4 when performing beam branching in two directions.
Figure 6:
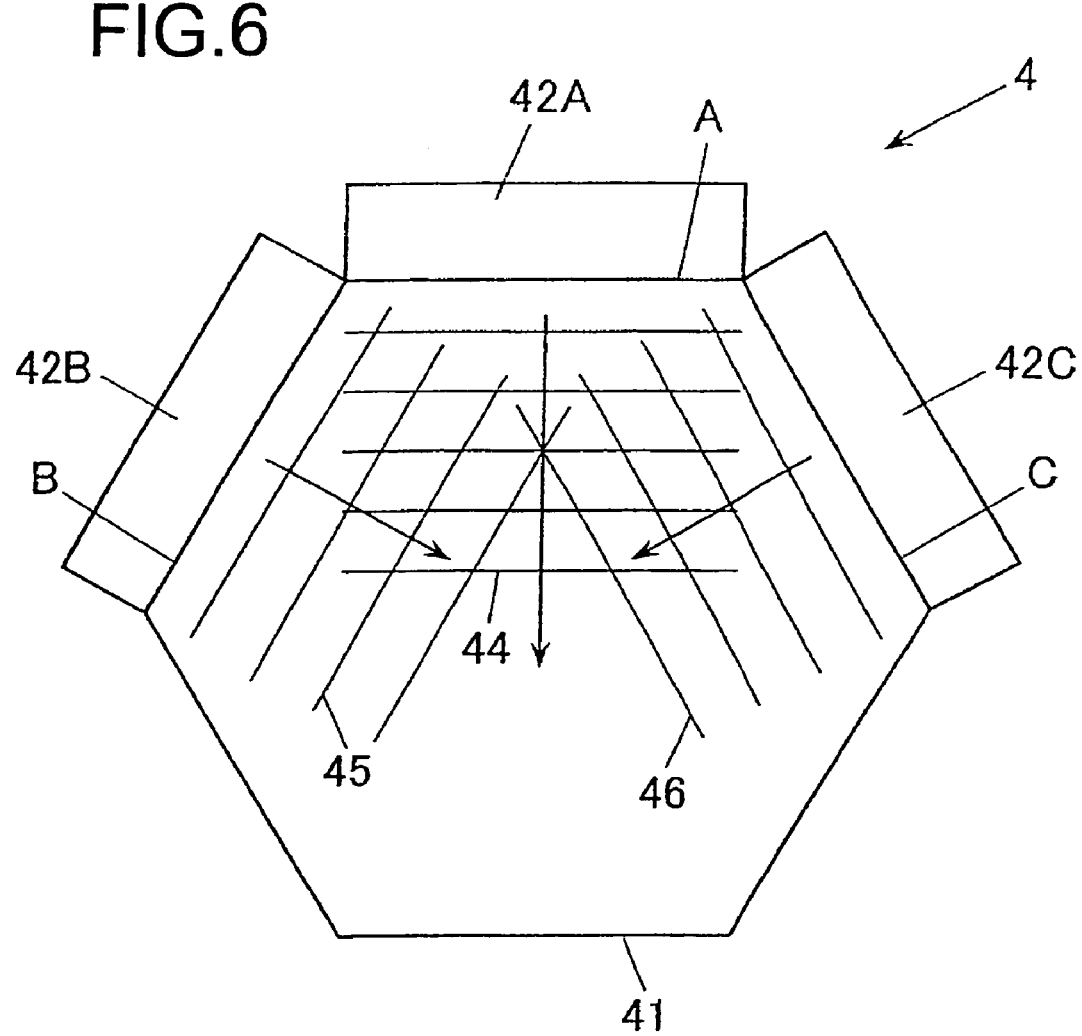
FIG. 6 is a figure showing an optical low pass filter 4 to which three piezo electric elements 42A, 42B, and 42C are provided.
Figure 7:
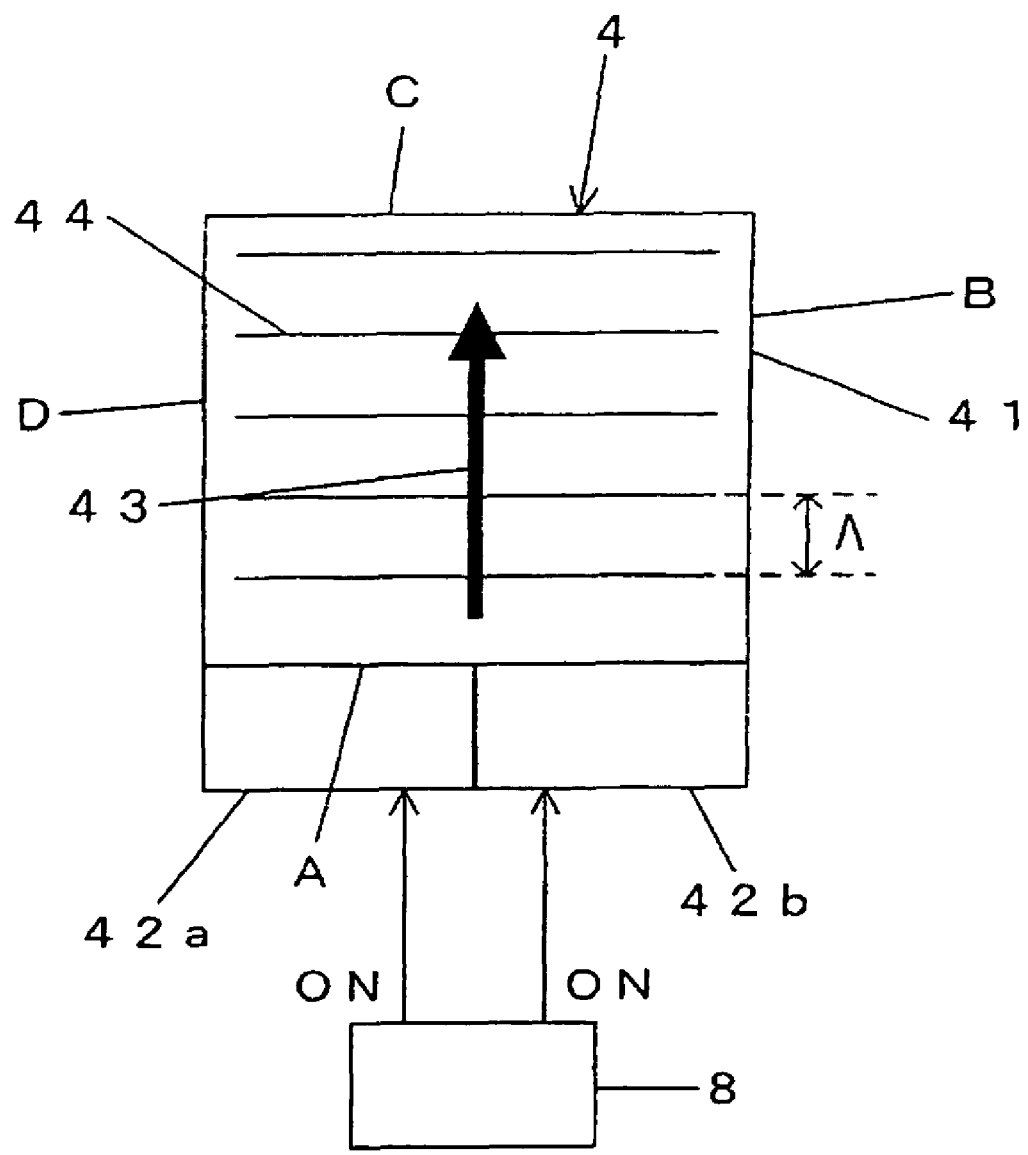
FIG. 7 is a figure for explanation of an operational state #1.

FIGS. 5 through 7 are figures showing variant embodiments of the optical low pass filter 4. With the optical low pass filter shown in FIG. 5, piezoelectric elements 42A and 42B are provided at the lower edge A and the right edge B of the light transmitting member 41, so that light which is incident is branched in both the vertical and the horizontal directions upon the optical low pass filter 4. In this case, the piezoelectric element 42B generates a compressional wave 45 which progresses in the horizontal direction, so that a cyclic refractive index distribution is generated in the light transmitting member 41 in the left and right direction. As a result, refractive index distributions which change cyclically in two different directions are generated within the plane of the light transmitting member 41, and a light beam which is incident upon the light transmitting member 41 is branched in two dimensions, both in the vertical direction and in the horizontal direction as seen in the figure.

In the optical low pass filter 4 shown in FIG. 6, the light transmitting member 41 is formed in the shape of a hexagon, and three piezoelectric elements 42A, 42B, and 42C are provided to three of the sides A, B, and C thereof. In this case as well, refractive index distributions which vary cyclically are obtained along the progression directions of each of the three resulting compressional waves 44, 45, and 46.

By providing a plurality of piezoelectric elements to the light transmitting member 41 in this manner, and by generating a plurality of compressional waves whose directions of progression are different, it is possible to generate or form refractive index distributions which vary cyclically in a plurality of different directions within the plane of the light transmitting member 41. As a result, it is possible to branch the light beam in a plurality of directions with the single optical low pass filter 4, and it is possible to reduce the dimension in the direction of the optical axis of the device as compared to the prior art, so that it is possible to anticipate making the device more compact. On the other hand, with an optical low pass filter which uses a birefringent crystalline material as in the prior art, it was necessary to dispose a plurality of optical members upon the optical axis corresponding to the branching directions.

Further, in the optical low pass filter 4 shown in FIG. 7, two piezoelectric elements 42a, 42b are provided side by side upon the side A of the light transmitting member 41. The drive circuit 8 is capable of applying high frequency voltages independently to each of these two piezoelectric elements 42a, 42b. In other words, it is possible to make the frequencies of the applied voltages and the level of their voltages the same between the piezoelectric element 42a and the piezoelectric element 42b, and it is also possible to make them different.

For example, if individual differences are present between the left and right piezoelectric elements 42a, 42b, then it is possible to obtain an almost uniform low pass filter characteristic over the entire area of the light transmitting member 41 by adjusting the levels and the frequencies of the applied electrical power. With the example shown in FIG. 7, if high frequency voltages of the same voltage and the same frequency are applied to the piezoelectric elements 42a, 42b, then compressional waves of the same frequency progress from the lower edge A in the direction towards the upper edge C, as shown by the arrow sign 43.

Since the piezoelectric elements 42a, 42b can be drive controlled independently, accordingly various different types of operational state become possible, according to the situation. Here, several types of representative operational state will be explained.

(Operational State #1)

In operational state #1, during normal photography, as shown in FIG. 7, the same compressional wave is generated in all of the regions of the light transmitting member 41, and the effect as a low pass filter is created in all of the regions of the light transmitting member 41. And if the user desires to photograph a sharp image in a situation such as one in which the influence of moire is small or when photographing scenery, then he actuates the actuation unit 10 so as to turn the applied voltage to the piezoelectric elements 42a, 42b OFF. In this case a sharp image can be obtained, since the light transmitting member 41 does not function as a low pass filter.

In this case, it would be acceptable to make the setting upon a setting screen for the piezoelectric elements 42a, 42b which is displayed upon a display section provided to the camera. Furthermore, instead of setting the piezoelectric elements 42a, 42b individually, for example, it would also be acceptable to arrange to provide the actuation unit 10 with a selector dial which is able to select photographic modes like "sharp photographic mode" and "scenery photographic mode" and the like, and to arrange for the applied voltages to the piezoelectric elements 42a, 42b to be set to zero when these photographic modes are selected.

(Operational State #2)

Figure 8:
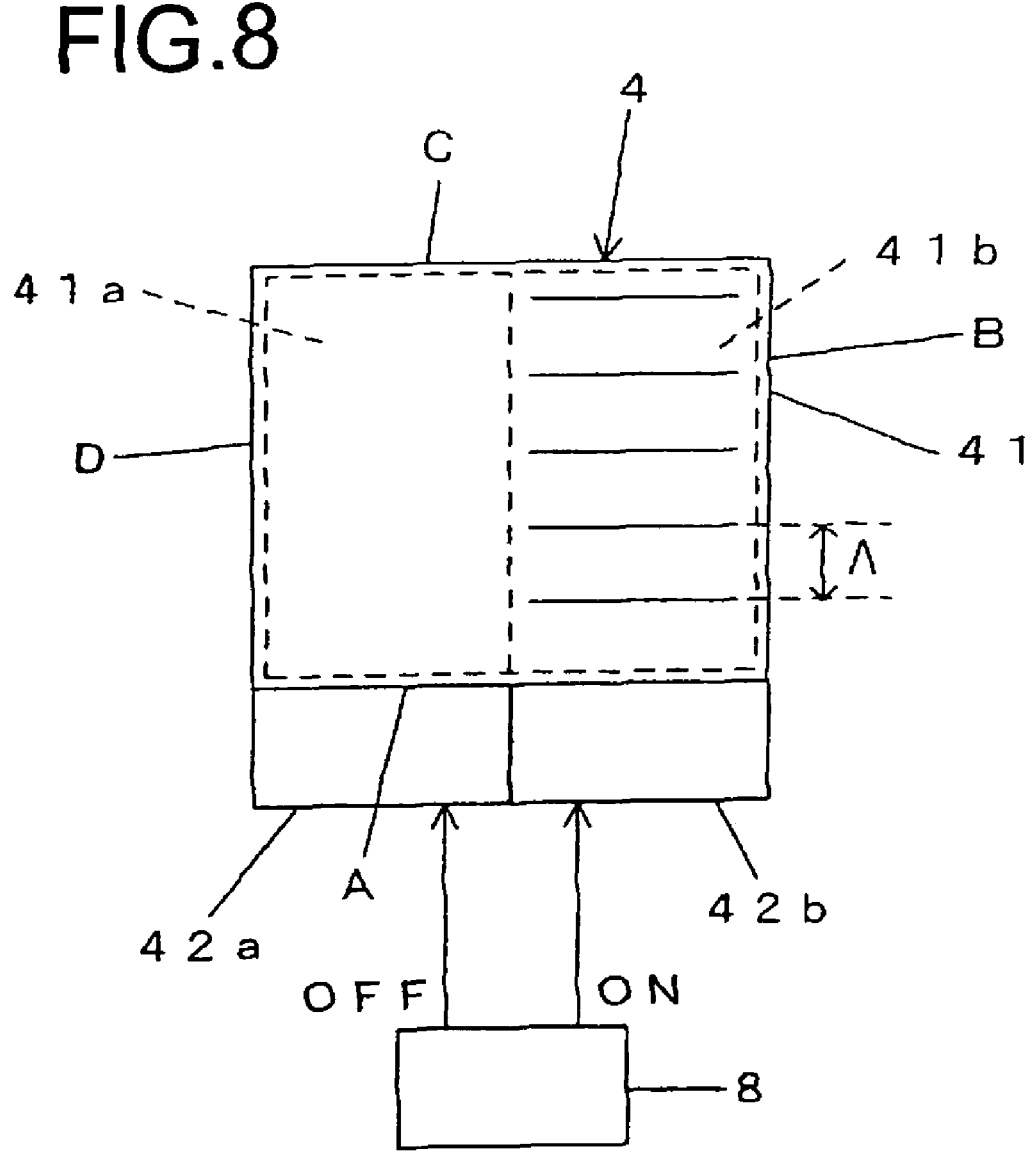
FIG. 8 is a figure for explanation of an operational state #2.

In operational state #2, a compressional wave is generated in one partial region of the light transmitting member 41, so that its effect as a low pass filter is generated in that region only. For example, as shown in FIG. 8, the applied voltage to the piezoelectric element 42a may be turned OFF, while the applied voltage to the piezoelectric element 42b is turned ON. When operation is performed in this manner, a compressional wave is only generated in the region 41b on the right side where the piezoelectric element 42b is provided, since a compressional wave whose frequency is in the ultrasound band has good straight line propagation characteristics.

As a result, the effect as a low pass filter is only generated in the region 41b of the light transmitting member 41. For example if it is desired to photograph an object to be photographed via the region 41a sharply, then the setting shown in FIG. 8 is established. Conversely if, during normal times when the piezoelectric elements 42a, 42b are turned OFF, it is perceived that the influence of moire is present in the region 41b, then the applied voltage to the piezoelectric element 42b is turned ON.

(Operational State #3)

Figure 9:
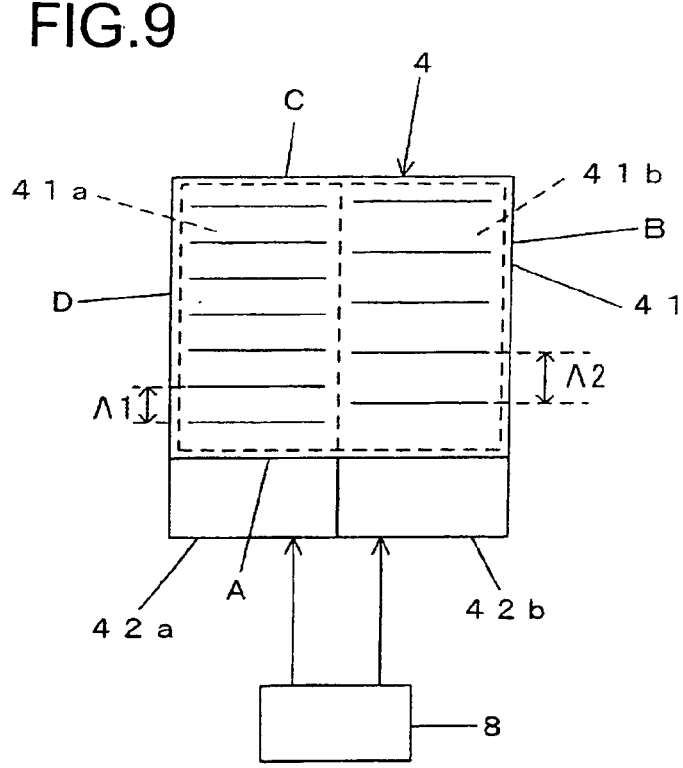
FIG. 9 is a figure for explanation of an operational state #3.

In operational state #2 control of the ON/OFF states of the voltages applied to the piezoelectric elements 42a, 42b was performed individually; but, in operational state #3, different filtering characteristics are established in the regions 41a and 41b, by individually controlling the applied electrical power frequencies (wavelength) and levels. As a result, it is possible to implement picture quality which reflects the intentions of the photographer differently for different regions of the image. FIG. 9 shows a case in which voltages of different frequencies are applied to the piezoelectric elements 42a, 42b. Since the frequencies for the piezoelectric elements 42a, 42b of the light transmitting member 41 are different, accordingly the spatial period of the refractive index distribution in the region 41a is Λ1, while that in the region 41b is Λ2.

Figure 10:
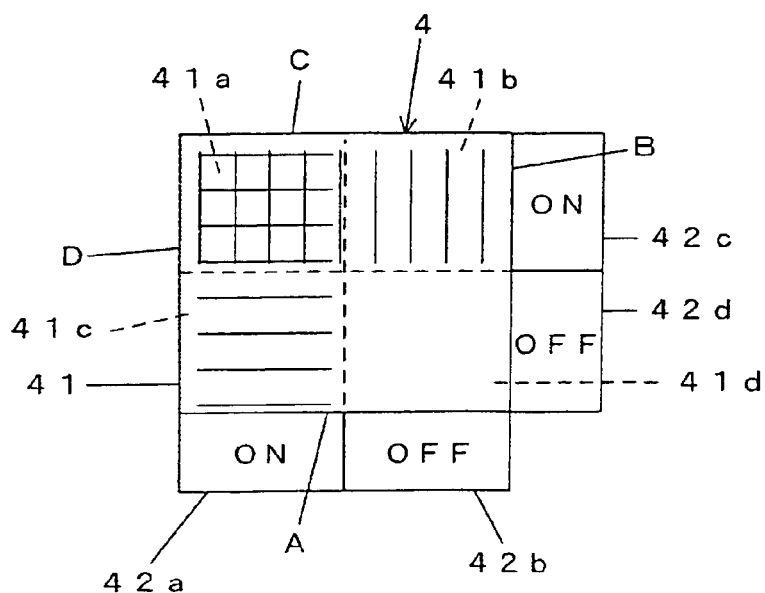
FIG. 10 is a figure showing an optical low pass filter 4 when piezoelectric elements 42a through 42d are provided upon its sides A and B.

Although, with the optical low pass filters 4 shown in FIGS. 7 through 9, a plurality of piezoelectric elements 42a, 42b were disposed along the one side A of the rectangular light transmitting member 41, it would also be acceptable to arrange to dispose a plurality of piezoelectric elements 42c, 42d along a side B which is orthogonal to the side A as well, as shown in FIG. 10. Each of the piezoelectric elements 42a through 42d is individually driven by a drive circuit 8 (not shown in the figures). The piezoelectric elements 42c, 42d generate compressional waves which progress in the horizontal direction as seen in the figure, and generate (create) acyclic refractive index distribution in the horizontal direction of the light transmitting member 41. As a result, cyclic refractive index distributions are generated or formed within the plane of the light transmitting member 41 in two directions, and a light beam which is incident upon the light transmitting member 41 is branched in two dimensions, both in the vertical direction and in the horizontal direction as seen in the figure.

By applying high frequency voltages of different frequencies and different electrical power levels to the various piezoelectric elements 42a through 42d, it is possible individually to control the wavelengths and the intensities of the compressional waves which are fed into the light transmitting member 41 from the piezoelectric elements 42a through 42d. As a result, it is possible to set the branching angles and the intensities of the branched beams individually for each of the regions 41a through 41d of the light transmitting member 41 in which the respective compressional waves operate.

In the example shown in FIG. 10, the applied voltages to the piezoelectric elements 42a and 42c are in the ON state, while the applied voltages to the piezoelectric elements 42b and 42d are in the OFF state. Thereby: the light beam which is incident in the region 41a is branched in both the vertical direction and the horizontal direction; the light beam which is incident in the region 41b is branched only in the horizontal direction; and the light beam which is incident in the region 41c is branched only in the vertical direction. Furthermore, since no compressional wave is generated in the region 41d, the low pass filter operation here is in the OFF state. In other words, the image in the region 41d is photographed sharply.

It should be understood that although, in the embodiments described above, two of the piezoelectric elements were disposed upon one side of the light transmitting member 41, it would also be acceptable to arrange for three or more piezoelectric elements to be disposed along one side thereof. The greater is the number of the piezoelectric elements, the more finely can the range of the control region of the filtering effect be set. Furthermore, the shape of the light transmitting member 41 is not limited to being rectangular; it would also be possible for it to be polygonal.

As described above, when controlling the applied voltage so as to control the filter function, the following types of method are contemplated.

(a) a method of controlling the separation width of the branched light beams by varying the frequency;
(b) a method of controlling the intensities of the branched light beams by varying the electrical power level;
(c) a method of finely controlling the filter function in each region by a combination of the above.

Changing the frequency and the electrical power level and turning the applied voltage ON and OFF may be performed as desired by actuating the actuation unit 10 shown in FIG. 1. Furthermore it is also possible to set the optimum setting conditions automatically by analyzing the image which has been photographed within the camera and by obtaining the optimum setting conditions, or to set the optimum setting conditions by presenting these analyzed optimum setting conditions to the photographer. For example, if the frequency is to be automatically set, then a plurality of images of the same object to be photographed are photographed under different frequency conditions, and the frequency for that image among these images in which the influence of moire is the least, is set as the optimum condition.

For example, as the above described photographic mode, it will be acceptable to arrange to provide a "light branching bracketing photographic mode" in which photography is performed a plurality of times while varying the low pass characteristics of the light transmitting member, and to make it possible to select this "light branching bracketing photographic mode" by actuating an actuation unit 10 which is built as a selector dial for photographic mode selection.

[Countermeasures for Preventing Compressional Wave Reflection at the End Surface]

Now, the compressional wave which has progressed through the interior of the light transmitting member 41 will be reflected at the end surface thereof in its progression direction. Accordingly, it would be acceptable to arrange to provide sound absorbent material at this end surface in the progression direction, in order to prevent reflection of the compressional wave at the end surface. Furthermore, it would also be acceptable to provide a further piezoelectric element at this progression end surface, so as to create a standing wave within the light transmitting member. In this case as well, a refractive index distribution is generated within the light transmitting member 41, so that it is possible to obtain the same beneficial effect as in the case of a progressive wave.

Figure 11:
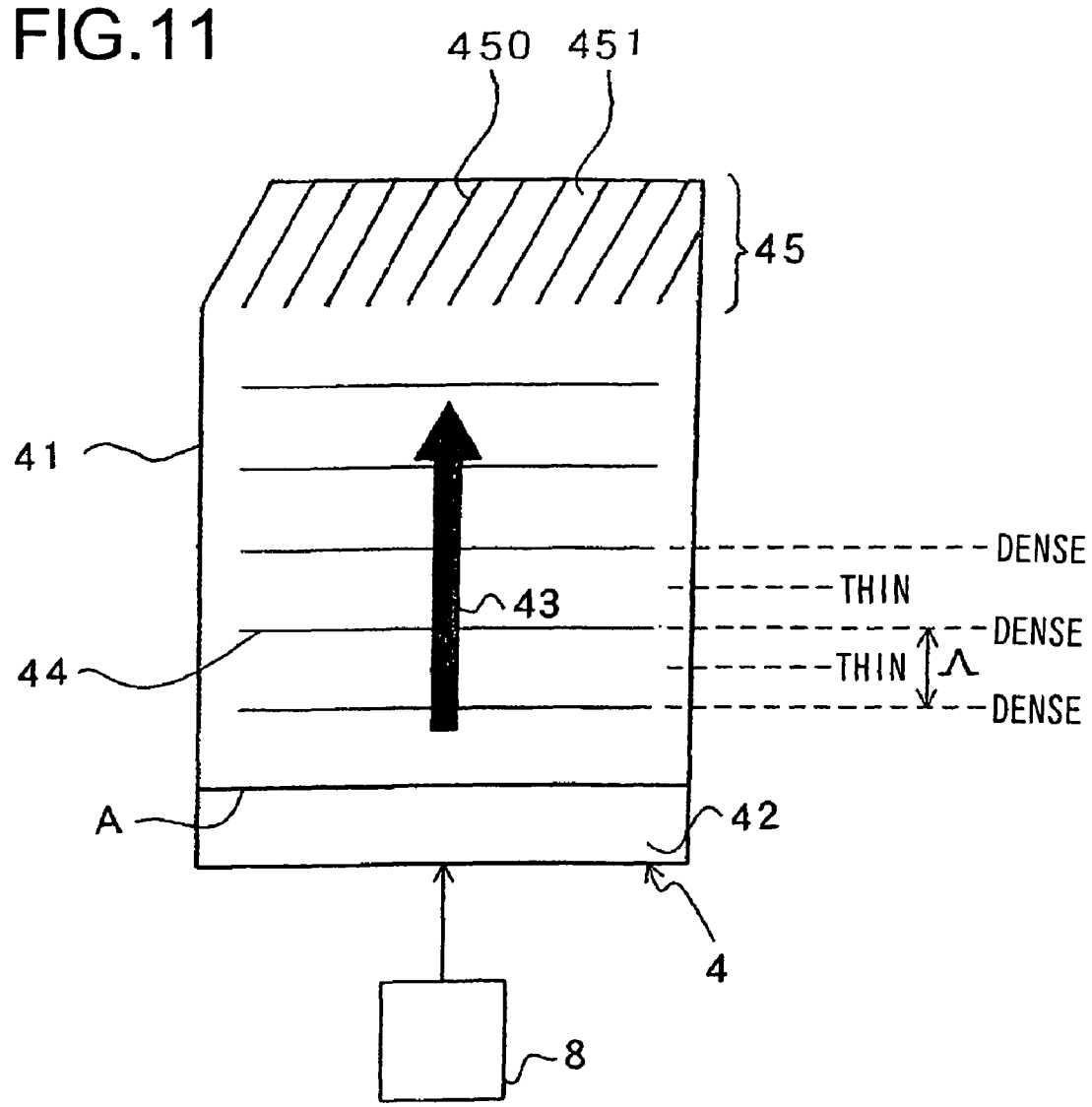
FIG. 11 is a figure showing a light transmitting member 41 upon which a multiple reflection portion 45 is formed.
Figure 12:
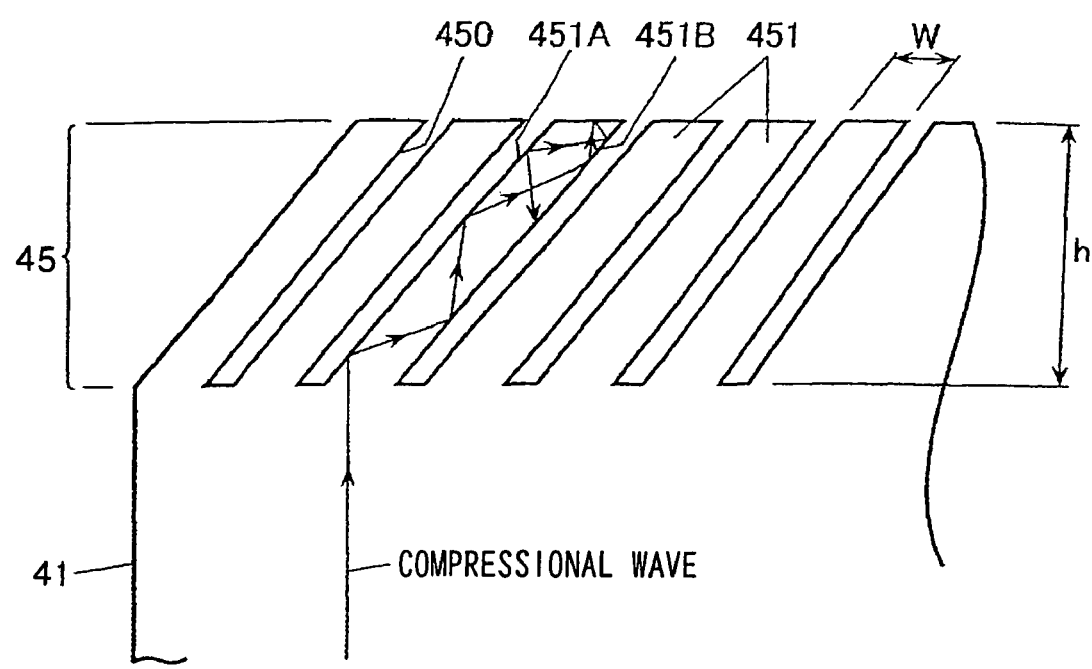
FIG. 12 is an enlarged view of this multiple reflection portion 45.

Furthermore, as in the case of the optical low pass filter 4 shown in FIG. 11, instead of attaching sound absorbent material to the end surface in the progression direction opposite to the surface A, it would also be acceptable to arrange to form a multiple reflection portion 45 at the end portion of the light transmitting member 41 in the progression direction. FIG. 12 is an enlarged view of this multiple reflection portion 45; along the end portion of this multiple reflection portion 45, there are formed a plurality of cutaway grooves 450, tilted at an angle with respect to the progression direction of the compressional wave. As a result, the multiple reflection portion 45 is formed the shape of a toothed comb, and the compressional wave which is progressing in the vertical direction as seen in the figure and which impinges upon this multiple reflection portion 45 enters into the tooth portions 451 of this toothed comb.

This compressional wave which has entered into the tooth portions 451 of this toothed comb is reflected by the surfaces 451A on the left sides of the comb tooth portions 451 as seen in the figure. This compressional wave which has been reflected by the surfaces 451A is then incident upon the surfaces 451B on the opposite side, and is reflected by these surfaces 451B. The compressional wave then progresses slopingly within the comb tooth portions 451 towards the upper right while being repeatedly reflected between the surfaces 451A and 451B in this manner, and arrives at the end surfaces 451C of the toothed comb portions 451. And the compressional wave is then reflected by these end surfaces 451C, and returns back within the toothed comb portions 451. At this time as well, the compressional wave progresses backwards while being repeatedly reflected between the surfaces 451A and 451B.

Since the compressional wave is attenuated each time it is reflected, accordingly the compressional wave which has entered within the toothed comb portions 451 is sufficiently attenuated by being multiply reflected between the surfaces 451A and 451B, and almost no compressional wave comes to be emitted downwards as seen in the figure from the multiple reflection portion 45. As a result, it is possible to utilize all of the interior region of the light transmitting member 41 shown in FIG. 11, except for its multiple reflection portion 45, as a filter region. Since the number of multiple reflections is increased, the smaller the width dimension W of the comb tooth portions 451 is made, accordingly it is possible to make the height h of the multiple reflection portion 45 smaller by making the width W smaller, and it is possible to reduce the proportion which the multiple reflection portion 45 occupies in the light transmitting member 41.

Figure 13:
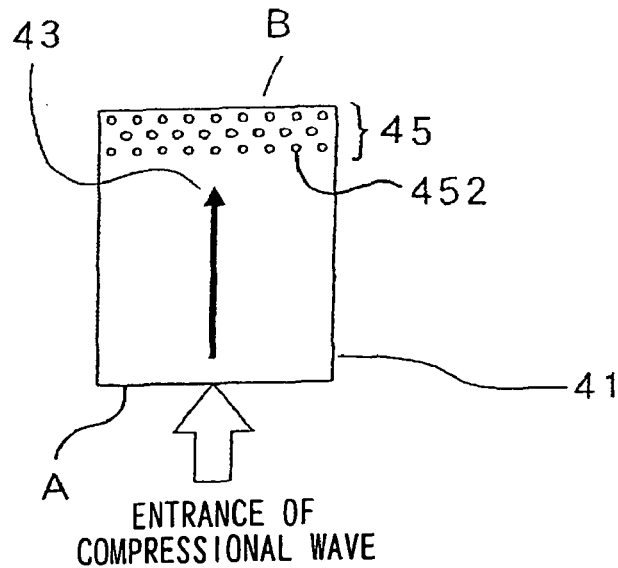
FIG. 13 is a figure showing another example of a multiple reflection portion 45.

Although in the example shown in FIG. 12 an interface was made, by forming the cutaway grooves 450, in which the compressional wave was subjected to multiple reflection, this is not to be considered as being limitative; any method may be applied which is a method by which an interface which is equivalent to the surfaces 451A, 451B can be formed in the light transmitting member 41. FIG. 13 is a figure showing another example of a multiple reflection portion 45; herein, a plurality of through holes 452 are formed in the multiple reflection portion 45. In this multiple reflection portion 45, a multiplicity of cylindrical interfaces are formed by through holes 452 which extend in the direction from front to back of the drawing paper.

In this case as well, since the cylindrical interfaces are inclined with respect to the progression direction of the compressional wave (i.e. in the direction of the arrow sign 43), accordingly the compressional wave which has entered into this multiple reflection portion 45 is reflected by these cylindrical interfaces, and is attenuated by repeated reflection. Furthermore, the compressional wave which reaches the end surface B and is reflected also, during its return travel, is attenuated by being repeatedly reflected by the through hole interfaces 452. As a result, it is possible to make the compressional wave which comes back downwards in the figure from this multiple reflection portion 45 extremely small, and it is possible to obtain the same beneficial effects as in the case of the optical low pass filter 4 shown in FIG. 11 and described above.

Figure 14:
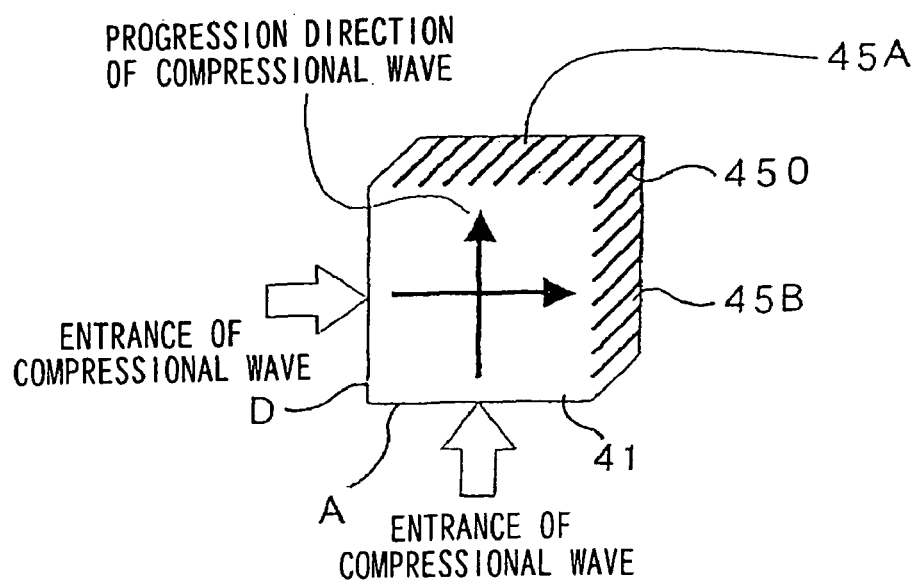
FIG. 14 is a figure showing a light transmitting member 41 in which cutaway grooves 450 are formed upon multiple reflection portions 45A, 45B.
Figure 15:
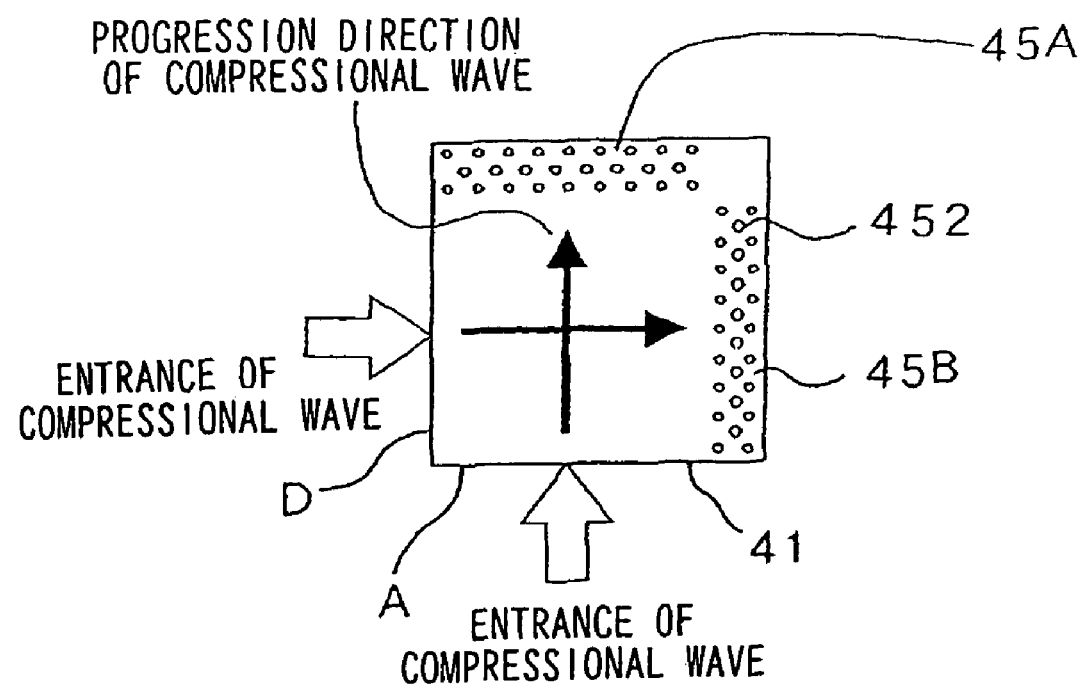
FIG. 15 is a figure showing a light transmitting member 41 in which through holes 452 are formed upon multiple reflection portions 45A, 45B.

Although, in the examples shown in FIGS. 11 and 13 and described above, cases were shown in which the incident light beam was branched in one direction (the vertical direction as seen in the figure), it would also be possible to apply the above concepts to cases in which the incident light beam is branched in two directions, i.e. both vertically and horizontally, as in the case of the optical low pass filter 4 shown in FIG. 5. FIG. 14 shows a case of a light transmitting member 41 in which cutaway grooves 450 are formed upon multiple reflection portions 45A, 45B of the light transmitting member 41, while FIG. 15 shows a case in which through holes 452 are formed upon such multiple reflection portions 45A, 45B.

In either of these cases, piezoelectric elements 42 (not shown in the figures) are provided to the surfaces A and D of the light transmitting member 41, so that a compressional wave enters into the light transmitting member from the surface A and travels in the upward direction, while similarly a compressional wave enters from the surface D and travels in the rightward direction. By inputting compressional waves in two directions in this manner, cyclic refractive index distributions are generated both in the vertical direction and in the horizontal direction, so that a light beam which is incident in the direction perpendicular to the drawing paper is branched in two directions, both in the vertical direction and in the horizontal direction. Since a multiple reflection portion 45A is provided at a portion which opposes the surface A, while also a multiple reflection portion 45B is provided at a portion which opposes the surface D, accordingly it is possible to reduce the influence of reflection of both of these compressional waves.

Although, in the embodiment described above, the case of application to an optical low pass filter in a single lens reflex type digital camera has been explained, it would also be possible to apply the present invention to a digital camera of a type which incorporates an integral lens, in the same manner. Furthermore, the present invention is not limited to application to a digital still camera; it could also be applied as an optical low pass filter for an image-capturing device incorporating an image sensor such as a video camera or the like. Yet further, the present invention is not limited at all by the embodiments described above, provided that the distinguishing features of the present invention are retained. For example, although a piezoelectric element was utilized as the refractive index distribution generation means, this is not limitative: it would also be possible to use some other type of transducer, provided that it is capable of generating a compressional wave (ultrasound) within the light transmitting member 41.

Although, in the above description, various embodiments and variant embodiments have been explained, the present invention is not to be considered as being limited by the contents thereof. Other modes which are considered to lie within the range of the technical concept of the present invention are also included within its scope.

The contents of the disclosures of the following patent applications upon which priority is based are hereby incorporated by reference:

Japanese Patent Application No. 2004-271785 (filed upon 17 Sep. 2004);
Japanese Patent Application No. 2005-38917 (filed upon 16 Feb. 2005);
Japanese Patent Application No. 2005-40261 (filed upon 17 Feb. 2005); and
Japanese Patent Application No. 2005-150026-(filed upon 23 May 2005).

The invention claimed is:

1. An optical low pass filter, comprising:
   a light transmitting member;
   a refractive index distribution generation unit that generates a refractive index distribution cyclically changing within a plane of the light transmitting member, the plane being perpendicular to an optical axis of a light beam incident to the light transmitting member, the refractive index distribution generation unit generating the refractive index distribution within the plane by generating a compressional wave progressing in the light transmitting member and comprising a piezoelectric element that generates the compressional wave in the light transmitting member by applying a high frequency voltage;
   a controller that controls the refractive index distribution generation unit so as to partially change a low pass filtering function according to the refractive index distribution within the plane of the light transmitting member; and
   an electrical power control circuit that controls a level of an electrical power applied to the piezoelectric element, wherein:
      if a minimum electrical power level among levels that make an intensity of a 0-th order diffracted beam of a subject light that is emitted from the light transmitting member be a relative minimum value is termed P, the electrical power control circuit controls the electrical power that is applied to the piezoelectric element within a range from zero to P.

2. An optical low pass filter according to claim 1, wherein:
   the light transmitting member has an optical transmittivity of greater than or equal to 50% per 1 mm of thickness at least in a range from wavelength 450 nm to 750 nm.

3. An optical low pass filter according to claim 1, wherein:
   the refractive index distribution generation unit generates the refractive index distribution in each of a plurality of directions within the plane of the light transmitting member.

4. An optical low pass filter according to claim 1, wherein:
   there are a plurality of the refractive index distribution generation units disposed along one edge of the light transmitting member.

5. An optical low pass filter according to claim 4, further comprising:
   a second refractive index distribution generation unit, generating a refractive index distribution that changes cyclically within the plane of the light transmitting member in a direction that intersects a direction of refractive index distributions generated by the plurality of refractive index distribution generation units.

6. An optical low pass filter according to claim 1, further comprising:
   a frequency control circuit that controls a frequency of the high frequency voltage.

7. An optical low pass filter according to claim 1, further comprising:
   a multiple reflection portion formed in an end portion of the light transmitting member in a direction of progression of the compressional wave, that multiply reflects the compressional wave.

8. An optical low pass filter according to claim 7, wherein:
   as the multiple reflection portion formed in the end portion of the light transmitting member, there are formed a plurality of surfaces inclined with respect to the direction of progression of the compressional wave; and
   the compressional wave that has entered the multiple reflection portion is multiply reflected between the plurality of surfaces.

9. An optical low pass filter according to claim 8, wherein:
   the plurality of surfaces are sides of a plurality of cutaway grooves formed in the end portion of the light transmitting member and inclined with respect to the direction of progression of the compressional wave.

10. An optical low pass filter according to claim 7, wherein:
    as the multiple reflection portion, there are formed a plurality of through holes in the end portion of the light transmitting member along the direction of progression of the compressional wave; and
    the compressional wave that has entered the multiple reflection portion is multiply reflected by sides of the through holes.

11. An optical low pass filter, comprising:
    a light transmitting member;
    a refractive index distribution generation unit that generates a refractive index distribution cyclically changing within a plane of the light transmitting member, the plane being perpendicular to an optical axis of a light beam incident to the light transmitting member, the refractive index distribution generation unit generating the refractive index distribution within the plane by generating a compressional wave progressing in the light transmitting member and comprising a piezoelectric element that generates the compressional wave in the light transmitting member by applying a high frequency voltage;
    a controller that controls the refractive index distribution generation unit so as to partially change a low pass filtering function according to the refractive index distribution within the plane of the light transmitting member; and
    an electrical power control circuit that controls a level of an electrical power applied to the piezoelectric element, wherein:
       if a minimum electrical power level among levels that make an intensity of a 0-th order diffracted beam of a subject light that is emitted from the light transmitting member be 50% of the intensity of the 0-th order diffracted beam when the electrical power is zero is termed P, the electrical power control circuit controls the electrical power that is supplied to the piezoelectric element within a range from zero to P.

12. An optical low pass filter according to claim 11, wherein:

the light transmitting member has an optical transmittivity of greater than or equal to 50% per 1 mm of thickness at least in a range from wavelength 450 nm to 750 nm.

13. An optical low pass filter according to claim 11, wherein the refractive index distribution generation unit generates the refractive index distribution in each of a plurality of directions within the plane of the light transmitting member.

14. An image-capturing device, comprising:
an image sensor that captures an image of a subject that has been formed by a photographic optical system; and
an optical low pass filter according to claim 1 that is disposed upon an optical axis between the photographic optical system and the image sensor.

15. An image-capturing device, comprising:
an image sensor that captures an image of a subject that has been formed by a photographic optical system;
an optical low pass filter according to claim 4 that is disposed upon an optical axis between the photographic optical system and the image sensor;
a mode setting circuit that selects and sets any one of a plurality of different photographic modes; and
a control circuit that controls each of the plurality of refractive index distribution generation circuit independently, according to the photographic mode that has been set by the mode setting circuit.

16. An image-capturing device, comprising:
an image sensor that captures an image of a subject that has been formed by a photographic optical system;
an optical low pass filter according to claim 1 that is disposed upon an optical axis between the photographic optical system and the image sensor; and
a setting circuit for setting the electrical power P.

17. An image-capturing device, comprising:
an image sensor that captures an image of a subject that has been formed by a photographic optical system;
an optical low pass filter according to claim 11 that is disposed upon an optical axis between the photographic optical system and the image sensor; and
a setting circuit for setting the electrical power P.

18. An optical low pass filter, comprising:
a light transmitting, member;
a piezoelectric element that generates a compressional wave in the light transmitting member by applying a high frequency voltage and generates a refractive index distribution cyclically changing within the plane of the light transmitting member; and
an electrical power control circuit that controls a level of an electrical power applied to the piezoelectric element, wherein:
if a minimum electrical power level among levels that make an intensity of a 0-th order diffracted beam of a subject light that is emitted from the light transmitting member be a relative minimum value is termed P, the electrical power control circuit controls the electrical power that is applied to the piezoelectric element within a range from zero to P.

19. An optical low pass filter, comprising:
a light transmitting member;
a piezoelectric element that generates a compressional wave in the light transmitting member by a applying high frequency voltage and generates a refractive index distribution cyclically changing within the plane of the light transmitting member; and
an electrical power control circuit that controls a level of an electrical power applied to the piezoelectric element, wherein:
if a minimum electrical power level among levels that make an intensity of a 0-th order diffracted beam of a subject light that is emitted from the light transmitting member be 50% of the intensity of the 0-th order diffracted beam when the electrical power is zero is termed P, the electrical power control circuit controls the electrical power that is supplied to the piezoelectric element within a range from zero to P.

20. An image-capturing method, comprising:
generating a refractive index distribution cyclically changing within a plane of a light transmitting member by generating a compressional wave progressing in the light transmitting member, the plane being perpendicular to an optical axis of a light beam incident to the light transmitting member, the compressional wave being generated by a piezoelectric element that generates the compressional wave in the light transmitting member by applying a high frequency voltage; and
partially changing a low pass filtering function according to the refractive index distribution within the plane of the light transmitting member,
wherein if a minimum electrical power level among levels that make an intensity of a 0-th order diffracted beam of a subject light that is emitted from the light transmitting member be a relative minimum value is termed P, controlling the electrical power that is applied to the piezoelectric element within a range from zero to P.

21. An image-capturing method, comprising:
providing an image sensor that captures an image of a subject that has been formed by a photographic optical system;
providing an optical low pass filter according to claim 1 upon an optical axis between the photographic optical system and the image sensor;
selectively setting any of a plurality of different photographic modes; and
controlling each of the plurality of refractive index distribution generation units independently, according to the photographic mode that has been set.

* * * * *